United States Patent
Chiu (10) Patent No.: US 10,867,363 B2
(45) Date of Patent: Dec. 15, 2020

(54) DEVICE AND METHOD FOR ACCELERATING GRAPHICS PROCESSOR UNITS, AND COMPUTER READABLE STORAGE MEDIUM

(71) Applicant: Shenzhen Fugui Precision Ind. Co., Ltd., Shenzhen (CN)

(72) Inventor: Kuo-Chun Chiu, New Taipei (TW)

(73) Assignee: Shenzhen Fugui Precision Ind. Co., Ltd., Shenzhen (CN)

( * ) Notice: Subject to any disclaimer, the term of this patent is extended or adjusted under 35 U.S.C. 154(b) by 0 days.

(21) Appl. No.: 16/369,028

(22) Filed: Mar. 29, 2019

(65) Prior Publication Data
US 2020/0242724 A1  Jul. 30, 2020

(30) Foreign Application Priority Data
Jan. 25, 2019 (CN) .......................... 2019 1 0072335

(51) Int. Cl.
G06T 1/20 (2006.01)
G06F 9/38 (2018.01)
G06F 9/50 (2006.01)
G06F 15/173 (2006.01)

(52) U.S. Cl.
CPC .............. *G06T 1/20* (2013.01); *G06F 9/3877* (2013.01); *G06F 9/5027* (2013.01); *G06F 15/17375* (2013.01)

(58) Field of Classification Search
CPC ......... G06T 1/20; G06T 15/005; G06T 15/08; G06F 9/3877; G06F 9/5027; G06F 15/17375; G06F 12/1072; G06F 15/173; G06N 3/04
See application file for complete search history.

(56) References Cited

U.S. PATENT DOCUMENTS

| 2017/0293994 | A1 | 10/2017 | Li et al. |
| 2018/0027044 | A1 | 1/2018 | Yuen et al. |
| 2018/0276044 | A1* | 9/2018 | Fong ............... G06F 9/5044 |
| 2019/0312772 | A1* | 10/2019 | Zhao ............... G06F 9/5044 |

FOREIGN PATENT DOCUMENTS

CN  107632953  1/2018

OTHER PUBLICATIONS

Anonymous: "White Paper, NVIDIA DGX-1 With Tesla, V100 System Architecture, The Fastest Platform for Deep Learning", Feb. 16, 2018 (Feb. 16, 2018), XP55638580, Retrieved from the Internet: URL: https://images.nvidia.com/content/pdf/dgx1-v100-system-architecture-whitepaper.pdf, abstract, p. 10, line 1-line 7, figures 4, 11-13.

Sungho Shin et al: "Workload-aware Automatic Parallelization for Multi-GPU DNN Training", arxiv.org, Cornell University Library, 2010LIN Library Cornell University Ithaca, NY 14853, Nov. 5, 2018 (Nov. 5, 2018), XP080942141, abstract, table 2, Section 3,4.

* cited by examiner

*Primary Examiner* — Xilin Guo
(74) *Attorney, Agent, or Firm* — ScienBiziP, P.C.

(57) ABSTRACT

A method for accelerating graphics processing units (GPUs) receives a request for usage of GPU resource sent by a user, calculates a quantity of GPUs which are necessary, and arrange the GPUs in several ways to maximize data transmission from and between the GPUs, and between the GPUs and one or more central processing units (CPUs) connected by switches between the GPUs and the CPUs. A device for accelerating GPUs is also provided.

15 Claims, 6 Drawing Sheets

DEVICE AND METHOD FOR ACCELERATING GRAPHICS PROCESSOR UNITS, AND COMPUTER READABLE STORAGE MEDIUM

FIELD

The disclosure generally relates to computer applications.

BACKGROUND

A graphics processing unit (GPU) makes use of a central processing unit (CPU) to accelerate deep learning, analysis, and engineering applications on a computer. To maximize utilization of the GPUs, tasks are allocated to resources. A job scheduler, such as SLURM/LSF/BPS, is used to schedule incoming tasks. However, the above scheduling can create a bandwidth bottleneck in PCIe (peripheral component interconnect express) bus, which has certain limitations of its own, and acceleration by the GPU is thus limited.

BRIEF DESCRIPTION OF THE DRAWINGS

Implementations of the present technology will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

Figure 1:
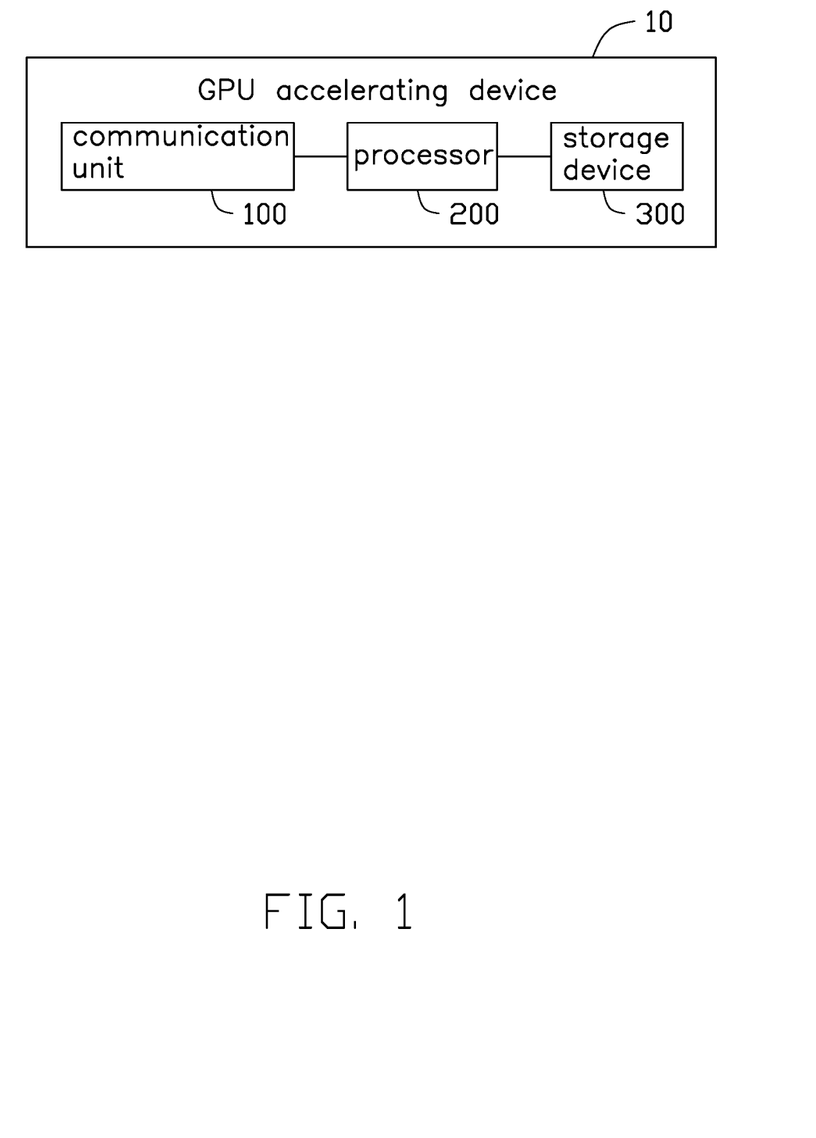
FIG. 1 is a schematic diagram of a GPU accelerating device in accordance with an embodiment of the present disclosure.

FIG. 1 illustrates a GPU accelerating device 10 of an embodiment of the present disclosure. A plurality of GPUs can exchange data with CPUs through switches, and two GPUs can exchange data with each other. An interactive connection can be formed between a GPU and a switch, and an interactive connection can be formed between a switch and a CPU. A Quick Path Interconnect (QPI, also known as CSI, a system for a common interface) can be formed between two CPUs. A number of the GPUs can be greater than or equal to a number of the switches, and the number of the switches can be greater than or equal to a number of the CPUs. In at least one embodiment, the switch can be, but is not limited to, a PCIe switch.

The GPU accelerating device 10 can include a communication unit 100, a processor 200, and a storage device 300. The processor 200 is electrically connected to the communication unit 100 and the storage device 300.

The communication unit 100 can establish a communication connection between two GPUs and the switches, and between the switches and the CPUs. In at least one embodiment, the communication unit 100 can establish a communication with other mobile terminals through a wireless network. The wireless network can be, but is not limited to, WIFI, BLUETOOTH, cellular mobile network, satellite network, and the like.

In at least one embodiment, the communication unit 100 can include independent connection ports, including but not limited to, D-Sub interface, D-Sub port, DVI-I terminal, and Video-In & Video-Out port, composite video terminal, S terminal, enhanced S terminal, DVI port, and HDMI port.

The storage device 300 can store data and program code for the GPU.

The storage device 300 can further store a formula for calculating a usage of the GPU under user resource request. The storage device 300 can further store principles of arrangement of the GPU and GPU index rule.

The storage device 300 may be, but is not limited to, read-only memory (ROM), random-access memory (RAM), programmable read-only memory (PROM), erasable programmable ROM (EPROM), one-time programmable read-only memory (OTPROM), electrically EPROM (EEPROM), compact disc read-only memory (CD-ROM), hard disk, solid state drive, or other forms of electronic, electromagnetic, or optical recording medium.

The processor 200 can be a digital signal processor (DSP), a microcontroller unit (MCU), a field-programmable gate array (FPGA), a CPU, a single chip microcomputer, a system on chip (SoC), or other equivalent dedicated chip.

Figure 2:
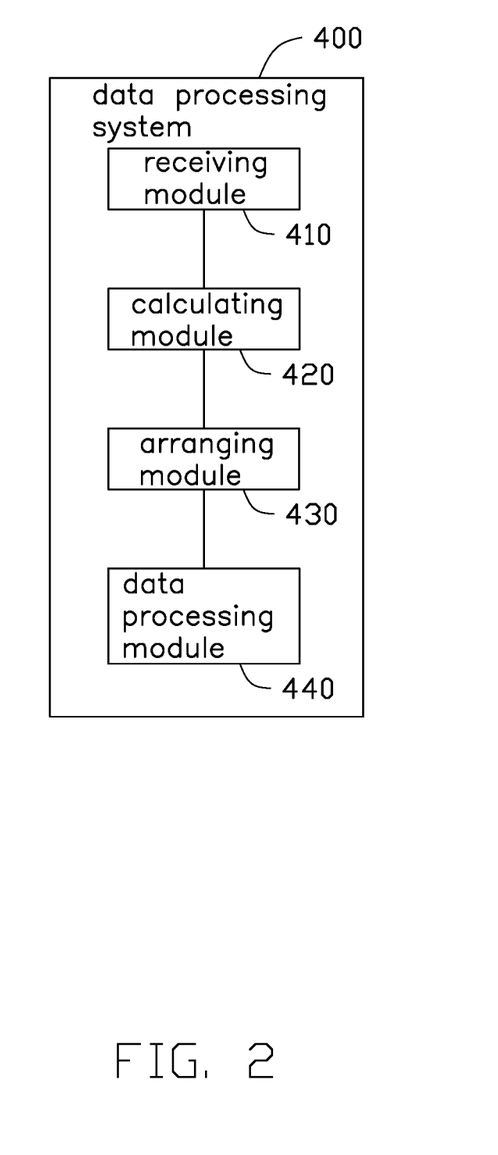
FIG. 2 is a schematic diagram of an embodiment of a data processing system.

FIG. 2 illustrates a data processing system 400 executed in the GPU accelerating device 10. The data processing system 400 may include several modules, which are a collection of software instructions stored in the storage device 300 and are executed by the processor 200. In the embodiment as disclosed, the data processing system 400 may include a receiving module 410, a calculation module 420, an arranging module 430, and a data processing module 440.

The receiving module 410 receives a resource usage request sent by the user.

The calculating module 420 calculates the usage relevant to the resource request according to preset calculation rules, and further obtains a usage of the GPU required for processing the request.

The calculation rules are based on factors such as the request for resource usage, completion time, and cost. For example, if the resource usage is relatively simple, the amount of data is relatively small, and the computational requirements for GPU is less, then a lesser number of GPUs are needed. More GPUs are needed to calculate the resource if the converse is true. If there is a time limit, the calculation needs to be completed as soon as possible, and more GPUs are needed. In theory, the greater the number of GPUs which are used, the faster the calculation of the resource usage can be completed, but additional cost is required in completing such computing. The user determines the number of GPUs needed to process his requirement according to the above-mentioned factors.

The arranging module 430 arranges a relationship in the arrangement between the GPUs and the switches, and a relationship in relation to the CPUs, according to the usage of GPUs and the preset arrangement principle, so as to arrange the GPU resources for optimal acceleration.

In at least one embodiment, there are three possible cases. In a first case, when the usage of GPUs calculated by the calculating module 420 is less than or equal to a first threshold, the arranging module 430 arranges each GPU to communicate with one switch. In a second case, when the usage of GPUs calculated by the calculating module 420 is greater than the first threshold but less than a second threshold, the arranging module 430 arranges the GPUs so as to maximize the bandwidth of the switch. In a third case, when the usage of GPUs is calculated to be greater than or equal to the second threshold, the arranging module 430 arranges the plurality of GPUs to create a ring index. The specific arranging method is provided in the method.

The data processing module 440 utilizes the GPUs to process the request.

Figure 3:
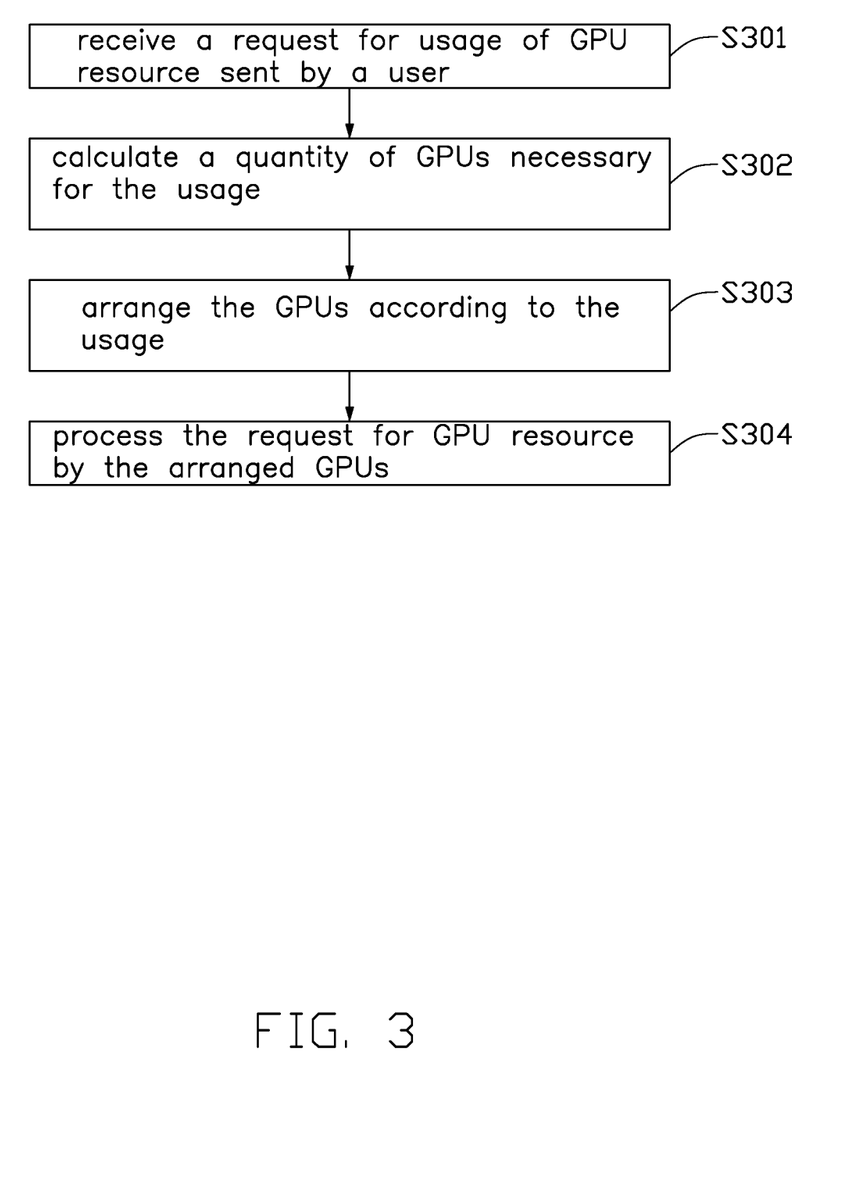
FIG. 3 is a flow chart of an embodiment of an accelerating method for GPU.

Referring to FIG. 3, the present disclosure provides a method for accelerating one or more GPUs. The method can begin at block S301.

At block S301, a request for usage of GPU resource sent by the user is received by the receiving module 410.

At block S302, a quantity of GPUs necessary for the usage is calculated.

The calculating module 420 may calculate the resource usage according to preset calculation rules, and obtain the quantity of the GPUs required to process the request.

In detail, the calculation rules are specifically determined based on factors such as the request for usage of resources, the completion time, and the cost. For example, if the desired usage is relatively simple, the amount of data is relatively small, and the computational requirements in relation to GPUs is less, then less GPUs are needed. On the other hand, more GPUs are needed for the converse. If there is a time limit and the calculation needs to be completed as soon as possible, more GPUs are needed. In theory, the more GPUs which are used, the faster is the calculation, but additional cost is required to complete the computing task. The user determines the number of GPUs needed to use to process his requirement according to the above-mentioned factors.

At block S303, the GPUs are arranged according to the usage to maximize data transmission of the GPUs.

The arranging module 430 arranges a relationship between the GPU and the switch, and an arrangement of the CPUs, according to the usage of GPUs and the preset arrangement principle. The GPU resources are arranged within reason to achieve optimization of GPU acceleration, the arrangement principle being stored in the storage device 300.

The principle of arrangement principle is as follows.

Figure 4:
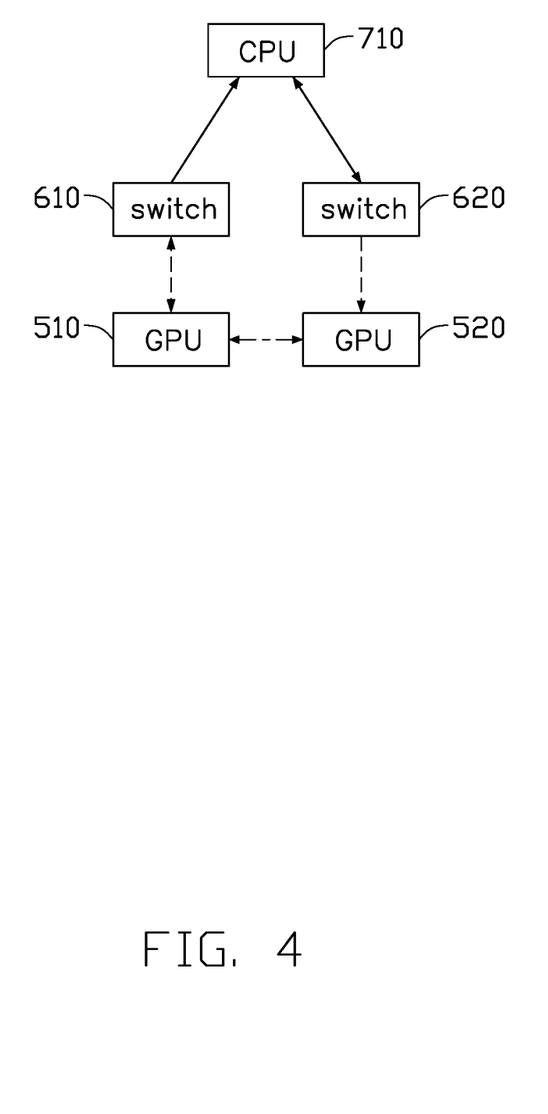
FIG. 4 is a schematic diagram of an embodiment of multiple GPUs arranged in a first case.

FIG. 4 illustrates an arrangement of the GPUs of the first case. When the quantity of the GPUs calculated for necessary usage is less than or equal to a first numerical threshold, the arranging module 430 arranges each GPU to communicate with one switch. The switches perform data interaction with one GPU. For example, in the present embodiment, the first threshold is two. When the usage of GPUs is two, GPU 510 and GPU 520 are selected. The GPU 510 communicates with a switch 610, the GPU 520 communicates with a switch 620, and the switches 610, 620 perform data interaction with a CPU 710.

Figure 5:
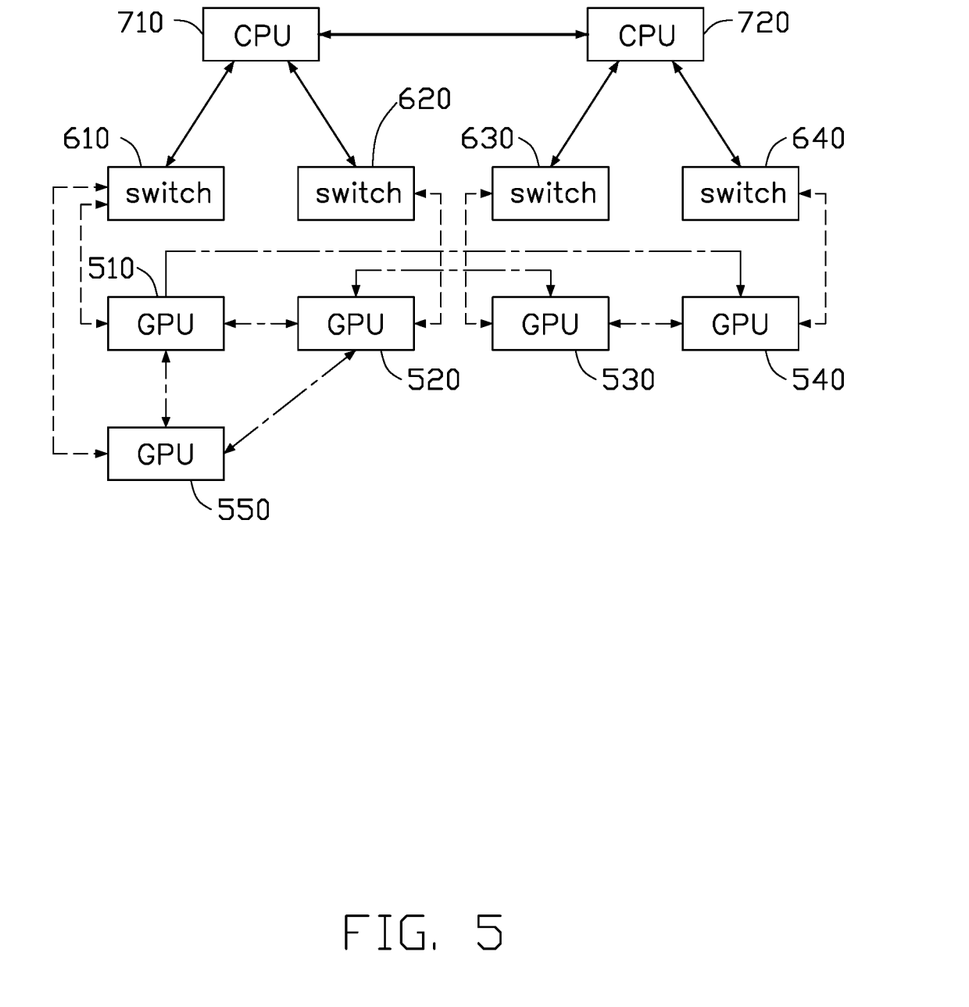
FIG. 5 is a schematic diagram of an embodiment of multiple GPUs arranged in a second case.

FIG. 5 illustrates the arrangement of the GPUs of the second case. When the usage of GPUs calculated as being required is greater than the first threshold but less than a second threshold, the arranging module 430 distributes the GPUs into groups. Each group of GPUs communicates with one switch to form a joint body. Joint bodies perform data interaction with at least two CPUs. For example, in at least one embodiment, the second threshold is eight. When the usage quantity of GPUs is five, then four switches (610, 620, 630, and 640) and two CPUs (710 and 720) are used. The GPUs are in four groups. The GPU 510 and the GPU 550 are arranged in one group, and GPU 520, GPU 530, and GPU 540 are in a group. Each group of GPUs communicates with a switch to form a joint body. The GPU 510, the GPU 550, and the switch 610 form one joint body. The GPU 520 and the switch 620 form one joint body, the GPU 530 and the switch 630 form one joint body, and the GPU 540 and the switch 640 form one joint body. Each joint body can interact data-wise with one CPU. In detail, the switch 610 and the switch 620 are connected to the CPU 710, and the switch 630 and the switch 640 are connected to the CPU 720.

If the usage quantity of GPUs is 4, such as GPU 510, GPU 520, GPU 530, and GPU540, each GPU is arranged in a group.

In the second case, each group of GPUs communicates with one switch to form the joint body, and the joint bodies are distributed as groups in themselves. Each group of joint bodies can exchange data with at least two CPUs, thus the bandwidth of the switch can be maximized.

With the above two arrangement of GPUs, the CPUs need to exchange gradients. The manner of exchange can be done in a centralized manner. Each CPU transmits its own gradient to the CPU, and the CPU calculates the gradients and transmits the gradients to other GPUs.

Figure 6:
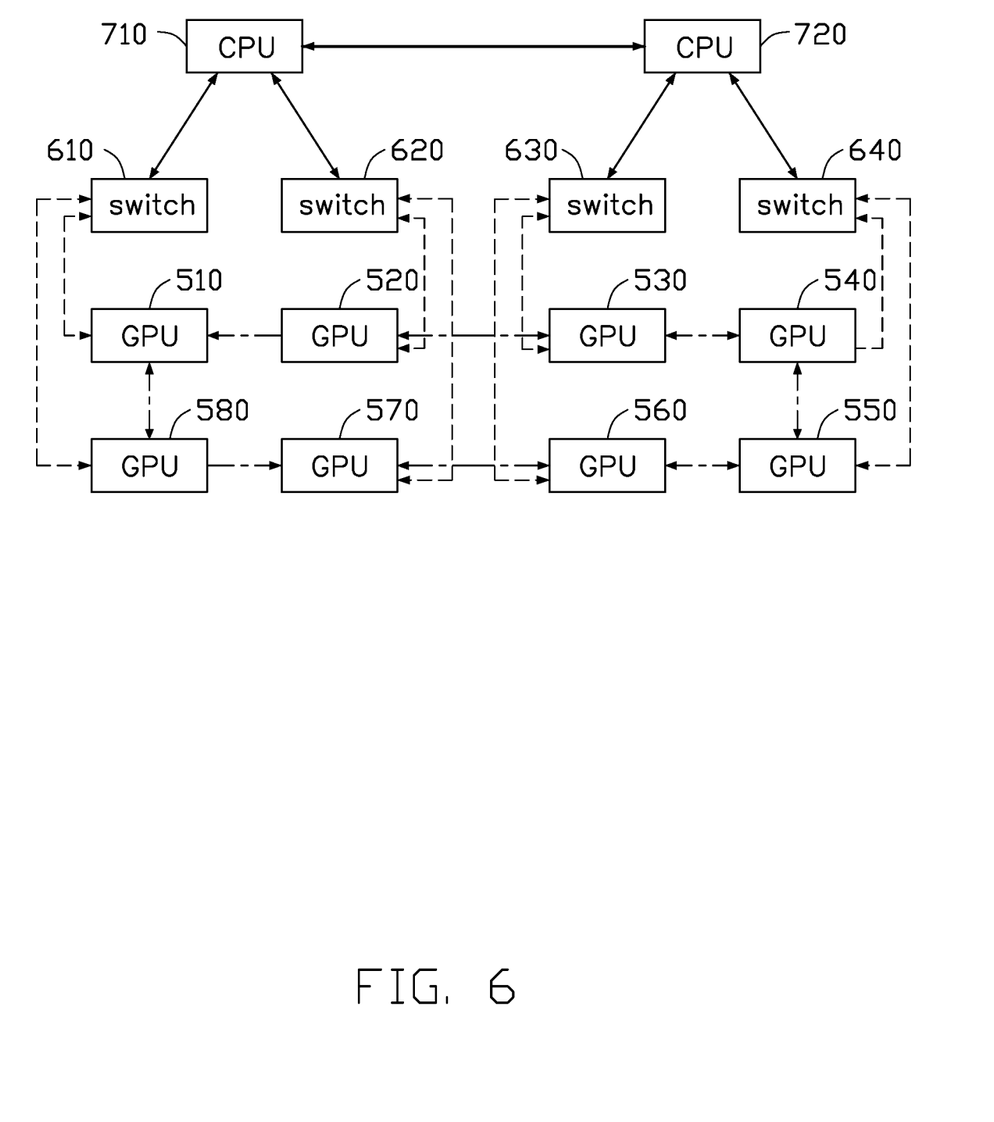
FIG. 6 is schematic diagram of an embodiment of multiple GPUs arranged in a third case.

FIG. 6 illustrates the arrangement of the GPUs of the third case. When the usage of GPUs calculated by the calculating module 420 is greater than or equal to the second threshold, the arranging module 430 arranges the plurality of GPUs to form a ring index according to a preset index rule. The GPUs in the ring index perform data interaction with the CPU through at least one switch. The index rule uses the NVlink connection of prior art, and is not detailed here. For example, when eight GPUs are to be used, four switches (610, 620, 630, and 640) and two CPUs (710 and 730) are used. The eight GPUs are GPU 510, GPU 520, GPU 530, GPU 540, GPU550, GPU 560, GPU 570, and GPU 580. The relationships of the GPUs are changed in the index to create a loop of the eight GPUs. Specifically, according to the preset index rule, the index numbers of the GPUs are changed by NVlink to form a loop structure in which GPU 510, GPU 520, GPU 530, GPU 540, GPU550, GPU 560, GPU 570, and GPU 580 are connected end to end. The GPU 510 and the GPU 580 are connected to the switch 610, the GPU 520 and the GPU 570 are connected to the switch 620, the GPU 530 and the GPUS 560 are connected to the switch 630, and the GPU 540 and the GPU 550 are connected to the switch 640. The switch 610 and the switch 620 are connected to the CPU 710, and the switch 630 and the switch 640 are connected to the CPU 720.

NVlink uses a point-to-point architecture and serial transmission protocol. NVlink is used for the connections between CPU and GPU, or the connections of multiple GPUs.

In other embodiments, the relationship of connections can be changed according to the user's request.

The index relationship between the GPUs can be changed to form the ring index, and the GPUs being the ring index reduces the data movements between the GPU and the CPU when processing requests for resources. The weight values between the GPUs are not limited by the bandwidth between GPU and GPU. NVlink accelerates communications between the GPUs and the GPUs, thereby reducing processing time, making data transfer between GPUs more efficient, and achieving optimal acceleration.

At block S304, the request for GPU resources is processed and satisfied by the arranged GPUs.

The data processing module 440 can process the request for resource usage.

The method for accelerating GPUs calculates the quantity of the GPUs required, and arranges the GPUs to maximize the GPU data transmissions. The method of the present disclosure is used to arrange the GPUs and improve the GPU operation performance within reasonable limits.

The method disclosed can be used in the fields of image calculation, deep learning training, and the like.

A person skilled in the art knows that all or part of the processes in the above embodiments can be implemented by a computer program to instruct related hardware, and that the program can be stored in a computer readable storage medium. When the program is executed, a flow of an embodiment of the methods as described above may be included.

Each function in each embodiment of the present invention may be integrated in one processor, or separate physical units may exist, or two or more units may be integrated in one physical unit. The above integrated unit can be implemented in the form of hardware or in the form of hardware plus software function modules.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A method for accelerating graphics processor units (GPUs), a plurality of GPUs exchanging data with central processing units (CPUs) through switches, a number of the GPUs being greater than or equal to a number of switches being greater than or equal to a number of the CPUs, the method comprising:
   receiving a request for usage of GPU resource sent by a user;
   calculating a quantity of the GPUs necessary for the usage;
   arranging the GPUs according to the usage to maximize data transmission of the GPUs; and
   processing the request for GPU resource by the arranged GPUs;
   wherein when the usage of the GPUs is less than or equal to a first threshold, a plurality of GPUs connected to different switches is selected, and the switches perform data interaction with one of the CPUs;
   when the usage of the GPUs is greater than the first threshold and less than or equal to a second threshold, the GPUs are distributed into groups, each group of GPUs communicates with one of the switches to form a joint body; and
   when the usage of the GPUs is greater than or equal to the second threshold, the GPUs are arranged to form a ring index according to a preset index rule.

2. The method for accelerating GPUs of claim 1, wherein when the usage of the GPUs is greater than the first threshold and less than or equal to a second threshold, the joint bodies perform data interaction with at least two CPUs.

3. The method for accelerating GPUs of claim 2, wherein each group of GPUs comprises one or more GPUs.

4. The method for accelerating GPUs of claim 2, wherein p1 when the usage of the GPUs is greater than or equal to the second threshold, the GPUs in the ring index perform data interaction with the CPU through at least one switch.

5. The method for accelerating GPUs of claim 4, wherein the preset index rule is to use an NVlink connection to change index numbers of the GPUs.

6. The method for accelerating GPUs of claim 4, wherein the first threshold is two, and the second threshold is eight.

7. A device for accelerating graphics processor units (GPUs), a plurality of GPUs exchanging data with central processing units (CPUs) through switches, a number of the GPUs being greater than or equal to a number of switches being greater than or equal to a number of the CPUs, the device comprising:
   a communication unit configured for to establish a communication connection between the GPUs and the switches, and the switches and the CPUs;
   a processor; and
   a storage device storing one or more programs, when executed by the processor, the one or more programs causing the processor to:
   receive a request for usage of GPU resource sent by a user;
   calculate a quantity of the GPUs necessary for the usage;
   arrange the GPUs according to the usage to maximize data transmission of the GPUs; and
   process the request for GPU resource by the arranged GPUs;
   wherein when the usage of the GPUs is less than or equal to a first threshold, a plurality of GPUs connected to different switches are selected, and the switches perform data interaction with one of the CPUs;
   when the usage of the GPUs is greater than the first threshold and less than or equal to a second threshold, the GPUs are distributed into groups, each group of GPUs communicates with one of the switches to form a joint body; and
   when the usage of the GPUs is greater than or equal to the second threshold, the GPUs are arranged to form a ring index according to a preset index rule.

8. The device for accelerating GPUs of claim 7, wherein when the usage of the GPUs is greater than the first threshold and less than or equal to a second threshold, the joint bodies perform data interaction with at least two CPUs.

9. The device for accelerating GPUs of claim 8, wherein each group of GPUs comprises one or more GPUs.

10. The device for accelerating GPUs of claim 8 wherein when the usage of the GPUs is greater than or equal to the second threshold, the GPUs in the ring index perform data interaction with the CPU through at least one switch.

11. The device for accelerating GPUs of claim 10, wherein the preset index rule is to use an NVlink connection to change index numbers of the GPUs.

12. The device for accelerating GPUs of claim 8, wherein the first threshold is two, and the second threshold is eight.

13. A non-transitory computer readable storage medium having stored thereon instructions that, when executed by at least one processor of a computing device, causes the processor to perform a method for accelerating graphic processor units (GPUs), a plurality of GPUs exchanging data with central processing units (CPUs) through switches, a number of the GPUs being greater than or equal to a number of switches being greater than or equal to a number of the CPUs, wherein the method comprises:

receiving a request for usage of GPU resource sent by a user;

calculating a quantity of the GPUs necessary for the usage;

arranging the GPUs according to the usage to maximize data transmission of the GPUs; and processing the request for GPU resource by the arranged GPUs;

wherein when the usage of the GPUs is less than or equal to a first threshold, a plurality of GPUs connected to different switches are selected, and the switches perform data interaction with one of the CPUs;

when the usage of the GPUs is greater than the first threshold and less than or equal to a second threshold, the GPUs are distributed into groups, each group of GPUs communicates with one of the switches to form a joint body; and when the usage of the GPUs is greater than or equal to the second threshold, the GPUs are arranged to form a ring index according to a preset index rule.

14. The non-transitory computer readable storage medium of claim 13, wherein when the usage quantity of the GPUs is greater than the first threshold and less than or equal to a second threshold, the joint bodies perform data interaction with at least two CPUs.

15. The non-transitory computer readable storage medium of claim 13, wherein when the usage of the GPUs is greater than or equal to the second threshold, the GPUs in the ring index perform data interaction with the CPU through at least one switch.

* * * * *